US012563287B2

(12) United States Patent
Wu et al.

(10) Patent No.: US 12,563,287 B2
(45) Date of Patent: Feb. 24, 2026

(54) LOCAL GENERATION OF COMMANDS TO A VEHICLE SENSOR

(71) Applicant: Infineon Technologies Americas Corp., El Segundo, CA (US)

(72) Inventors: Dance Wu, Palo Alto, CA (US); Amir Bar-Niv, Sunnyvale, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 72 days.

(21) Appl. No.: 18/168,591

(22) Filed: Feb. 14, 2023

(65) Prior Publication Data

US 2023/0262327 A1 Aug. 17, 2023

Related U.S. Application Data

(60) Provisional application No. 63/310,188, filed on Feb. 15, 2022.

(51) Int. Cl.
H04N 23/661 (2023.01)
B60W 50/06 (2006.01)
(Continued)

(52) U.S. Cl.
CPC .......... H04N 23/661 (2023.01); B60W 50/06 (2013.01); H04N 7/183 (2013.01); H04N 23/67 (2023.01);
(Continued)

(58) Field of Classification Search
CPC ........ H04W 4/48; B60W 50/00; B60W 50/06; B60W 50/065; B60W 2050/0001;
(Continued)

(56) References Cited

U.S. PATENT DOCUMENTS 8,879,858 B1 * 11/2014 Mobbs .................. G06T 3/4015
375/240.11
9,760,827 B1 * 9/2017 Lin .......................... G06N 3/08
(Continued)

FOREIGN PATENT DOCUMENTS

EP 3950435 A1 2/2022

OTHER PUBLICATIONS

IEEE Std. 802.3ch-2020, "IEEE Standard for Ethernet— Amendment 8: Physical Layer Specifications and Management Parameters for 2.5 Gb/s, 5 Gb/s, and 10 Gb/s Automotive Electrical Ethernet," IEEE Computer Society, pp. 1-207, year 2020.
(Continued)

*Primary Examiner* — John W Miller
*Assistant Examiner* — Humam M Satti
(74) *Attorney, Agent, or Firm* — Meitar Patents Ltd.; Daniel Kligler

(57) ABSTRACT

An apparatus for controlling an imaging sensor in a vehicle includes an Ethernet transceiver, a sensor interface and a local processor. The Ethernet transceiver is configured to communicate over an in-vehicle Ethernet network with a remote processor. The sensor interface is configured to communicate with the imaging sensor. The local processor that is local to the apparatus and remotely located from the remote processor is configured to receive from the imaging sensor, via the sensor interface, image data and auxiliary data related to the image data, to send at least the image data to the remote processor via the Ethernet transceiver, to generate locally, based on the auxiliary data, and independently from the remote processor, control commands to control an operational aspect of the imaging sensor, and to send the control commands to the imaging sensor via the sensor interface.

22 Claims, 3 Drawing Sheets

(51) Int. Cl.
  *H04N 7/18* (2006.01)
  *H04N 23/67* (2023.01)
  *H04N 23/71* (2023.01)
(52) U.S. Cl.
  CPC ....... *H04N 23/71* (2023.01); *B60W 2050/065*
  (2013.01)
(58) Field of Classification Search
  CPC . B60W 2050/0008; B60W 2050/0013; B60W
  2050/0014; B60W 2050/0016; B60W
  2050/0018; B60W 2050/0019; B60W
  2050/0026; B60W 2050/0027; B60W
  2050/0031; B60W 2050/0043; B60W
  2050/0062; B60W 2050/0075; B60W
  2050/0082; B60W 2050/0083; B60W
  2050/0097; B60W 2050/065; H04N
  23/90; H04N 7/181; H04N 23/72; H04N
  23/661; H04N 23/665; H04N 23/60;
  H04N 23/66; H04N 5/268; H04N 7/183;
  H04N 23/67; H04N 23/71; G06T 7/80;
  B60R 16/023; H04L 12/12; H04L
  12/40117
  See application file for complete search history.

(56)                References Cited

U.S. PATENT DOCUMENTS

2005/0030808 A1   2/2005  Brown et al.
2014/0146132 A1*  5/2014  Bagnato ................. H04N 23/45
                                            348/36
2015/0350750 A1*  12/2015 Yun ......................... H04Q 9/00
                                            340/870.07
2016/0112624 A1*  4/2016  Kroekel ............... H04N 23/661
                                            348/148
2016/0119617 A1*  4/2016  Sagar .................... H04N 23/75
                                            348/187
2018/0349709 A1*  12/2018 Shinohara .............. G06V 20/52
2020/0283019 A1*  9/2020  van Kampen ....... G05D 1/0223
2021/0001810 A1*  1/2021  Rivard ................. G06V 40/172
2021/0096225 A1*  4/2021  Subasingha ............ G01S 17/10
2021/0183173 A1   6/2021  Mizrahi
2021/0227129 A1*  7/2021  Honda .............. H04N 1/00167
2021/0235486 A1*  7/2021  Atefi ................... H04W 74/002
2021/0243913 A1*  8/2021  Zheng ................... H05K 7/202
2021/0267101 A1   8/2021  Huang et al.
2022/0027643 A1*  1/2022  Ono ...................... G06V 20/58
2023/0164431 A1*  5/2023  Nanaumi ............ H04N 23/661
                                            348/211.1

OTHER PUBLICATIONS

"IEEE Standard for Adoption of MIPI Alliance Specification for A-PHY Interface (A-PHY) Version 1.0," The Institute of Electrical and Electronics Engineers, Inc. (IEEE), pp. 1-205, year 2021.
Automotive SerDes Alliance, "ASA Transceiver Specification", Version 1.1, pp. 1-322, Apr. 25, 2023.
International Application # PCT/IB2023/051321 Search Report dated May 9, 2023.

* cited by examiner

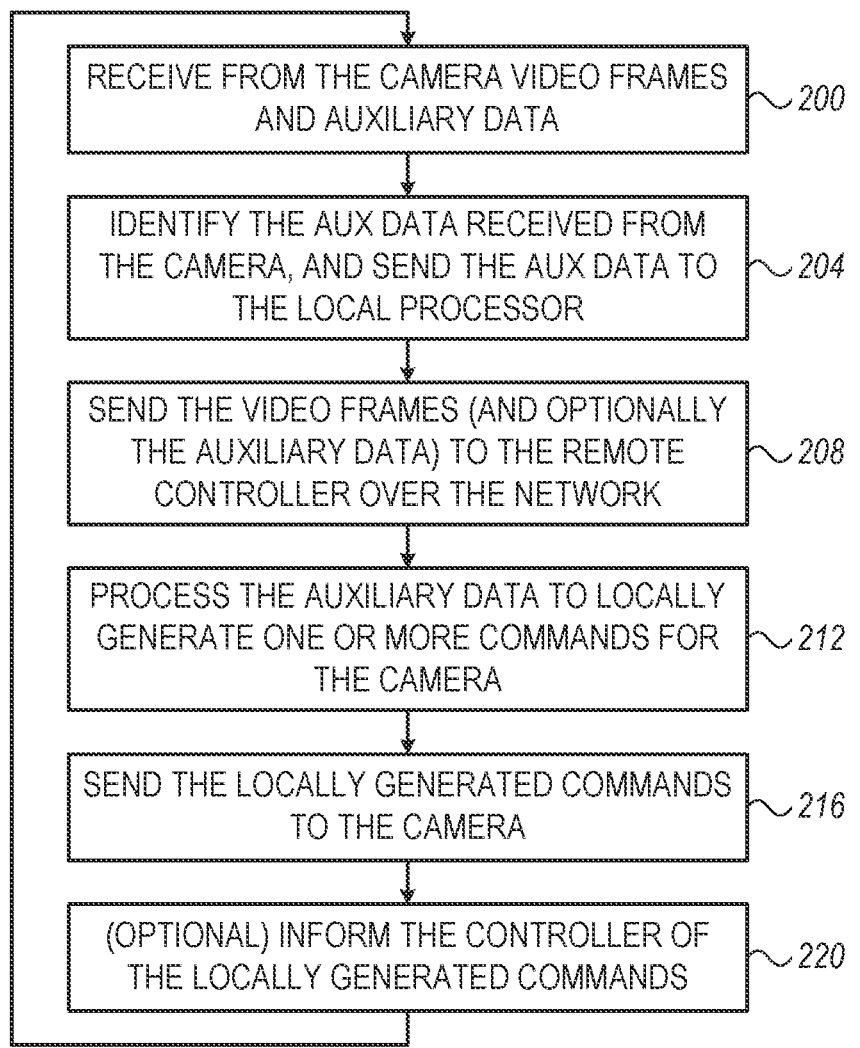

RECEIVE FROM THE CAMERA VIDEO FRAMES AND AUXILIARY DATA ~ 200

IDENTIFY THE AUX DATA RECEIVED FROM THE CAMERA, AND SEND THE AUX DATA TO THE LOCAL PROCESSOR ~ 204

SEND THE VIDEO FRAMES (AND OPTIONALLY THE AUXILIARY DATA) TO THE REMOTE CONTROLLER OVER THE NETWORK ~ 208

PROCESS THE AUXILIARY DATA TO LOCALLY GENERATE ONE OR MORE COMMANDS FOR THE CAMERA ~ 212

SEND THE LOCALLY GENERATED COMMANDS TO THE CAMERA ~ 216

(OPTIONAL) INFORM THE CONTROLLER OF THE LOCALLY GENERATED COMMANDS ~ 220

*FIG. 3*

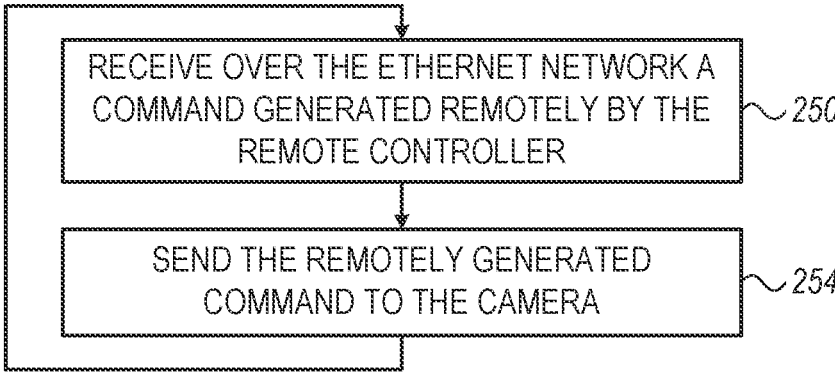

RECEIVE OVER THE ETHERNET NETWORK A COMMAND GENERATED REMOTELY BY THE REMOTE CONTROLLER ~ 250

SEND THE REMOTELY GENERATED COMMAND TO THE CAMERA ~ 254

*FIG. 4*

LOCAL GENERATION OF COMMANDS TO A VEHICLE SENSOR

CROSS-REFERENCE TO RELATED APPLICATIONS

This application claims the benefit of U.S. Provisional Patent Application 63/310,188 filed Feb. 15, 2022, whose disclosure is incorporated herein by reference.

FIELD OF THE DISCLOSURE

The present disclosure relates generally to communication networks, and particularly to methods and systems for local control of a sensor in a vehicle by a sensor bridge.

BACKGROUND

Various systems and applications, such as automotive systems and industrial control systems, employ sensors that are connected to an Ethernet network. The sensors send the data they acquire, and receive control commands, over the network.

The description above is presented as a general overview of related art in this field and should not be construed as an admission that any of the information it contains constitutes prior art against the present patent application.

SUMMARY

An embodiment that is described herein provides an apparatus for controlling an imaging sensor in a vehicle, the apparatus including an Ethernet transceiver, a sensor interface, and a local processor. The Ethernet transceiver, configured to communicate over an in-vehicle Ethernet network with a remote processor. The sensor interface is configured to communicate with the imaging sensor. The local processor that is local to the apparatus and remotely located from the remote processor is configured to receive from the imaging sensor, via the sensor interface, image data and auxiliary data related to the image data, and send at least the image data to the remote processor via the Ethernet transceiver, to generate locally, based on the auxiliary data, and independently from the remote processor, control commands to control an operational aspect of the imaging sensor, and to send the control commands to the imaging sensor via the sensor interface.

In some embodiments, the local processor is configured to generate locally at least some of the control commands instead of the remote processor, so as to reduce traffic load in the Ethernet network created by sending control commands for controlling the sensor by the remote processor over the Ethernet network. In other embodiments, the transceiver includes a transmitter and a receiver, and the local processor is configured to power down the receiver, in response to detecting that no commands are received from the remote processor for a predefined period. In yet other embodiments, the imaging sensor includes a camera that is configured to generate the image data by capturing individual image frames, and to provide the auxiliary data for the individual image frames, and the local processor is configured to locally generate the control commands by processing the auxiliary data for the individual image frames.

In an embodiment, the individual image frames include multiple image pixels, the auxiliary data includes a histogram of luminance levels associated with the image pixels of a given image frame, and the local processor is configured to locally generate the control commands by processing the histogram of the given image frame. In another embodiment, the local processor is configured to generate the control commands to control a quality level of the individual image frames by controlling one or more operational aspects of the camera selected from a list including: exposure time, contrast, color balance, aperture, and sensor sensitivity. In yet another embodiment, the local processor is configured to locally provide a given control command to the sensor at a first latency that is shorter than a second latency incurred in remotely providing the given control command by the remote processor.

In some embodiments, the local processor is configured to selectively inform the remote processor of the control commands generated by the local processor. In other embodiments, the local processor is configured to receive from the remote processor a given control command that the remote processor has generated based on one or both of the image data and the auxiliary data, and to send the received given control command to the imaging sensor. In yet other embodiments, the sensor includes a camera that generates the image data by capturing multiple image frames, and the given control command includes a focus command that the remote processor generated by analyzing two or more of the image frames, for controlling a focus setting of the camera.

There is additionally provided, in accordance with an embodiment that is described herein, a method for controlling an imaging sensor in a vehicle, the method including, in an apparatus that communicates locally with an imaging sensor via a sensor interface, and with a remote processor over an in-vehicle Ethernet network using an Ethernet transceiver, receiving from the imaging sensor, via the sensor interface, image data and auxiliary data related to the image data, and sending at least the image data to the remote processor over the Ethernet network using the Ethernet transceiver. Control commands are generated locally in the apparatus, based on the auxiliary data, and independently from the remote processor, to control an operational aspect of the imaging sensor. the control commands are sent to the imaging sensor via the sensor interface.

The present disclosure will be more fully understood from the following detailed description of the embodiments thereof, taken together with the drawings in which:

BRIEF DESCRIPTION OF THE DRAWINGS

FIG. 3 is a flow chart that schematically illustrates a method for local generation of commands for controlling a camera in a vehicle, in accordance with an embodiment that is described herein; and FIG. 4 is a flow chart that schematically illustrates a method for relaying commands generated by a remote controller, for controlling a camera in a vehicle, in accordance with an embodiment that is described herein.

DETAILED DESCRIPTION OF EMBODIMENTS

Figure 1:
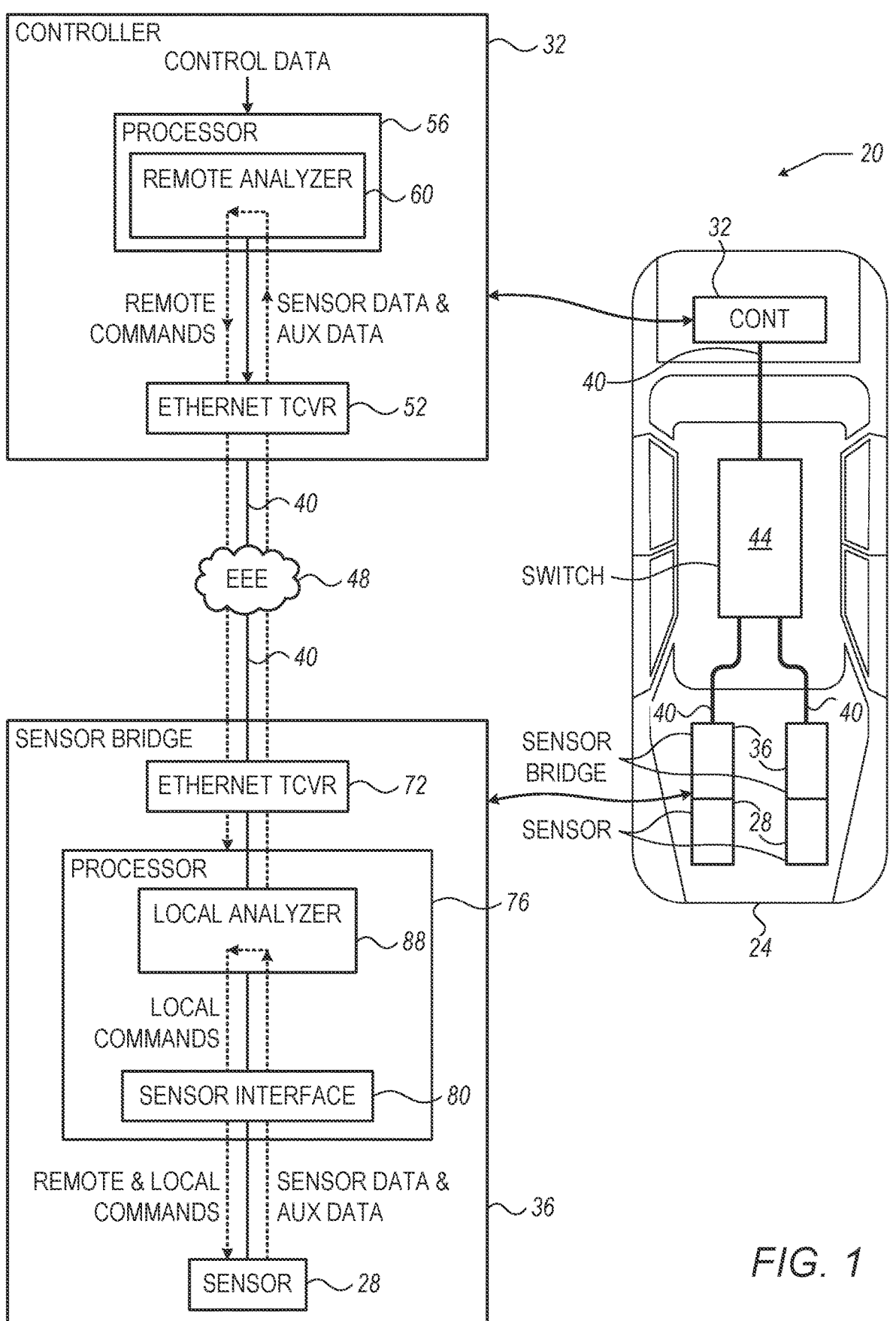
FIG. 1 is a block diagram that schematically illustrates an automotive Ethernet communication system with local sensor control, in accordance with an embodiment that is described herein.

In systems that involve communicating with sensors over a network, it is sometimes required to control the sensors.

Embodiments that are described herein provide improved systems and methods for controlling sensor operation by locally generating, at a local processor that is separate from a remotely located central processor, selected commands for controlling various aspects of sensor operation. The embodiments described herein refer mainly to automotive systems in which multiple sensors are connected to an Ethernet network. The disclosed techniques, however, are suitable for use in any other suitable system, e.g., in industrial control systems, and with various types of sensors. Non-limiting examples of sensors used in automotive systems include video cameras, velocity sensors, accelerometers, audio sensors, infra-red sensors, radar sensors, lidar sensors, ultrasonic sensors, rangefinders or other proximity sensors, and the like.

In some embodiments, a system comprises one or more sensors, and a remote controller that receives data from the sensors and controls the sensors over an Ethernet network. The controller may comprise, for example, a system Central Processor Unit (CPU), a Graphics Processing Unit (GPU) or any other suitable type of processor. In some embodiments the controller may be integrated into a switch of the Ethernet network. A given sensor typically is connected to the network via a "sensor bridge". The sensor bridge communicates with the controller over the network using Ethernet, and with the sensor using one or more local interfaces. The type of local interface may vary from one sensor type to another. As will be described below, in the disclosed embodiments, principal control of a sensor is offloaded from the remotely disposed controller to the sensor bridge, with main control of the sensor being performed locally by the sensor bridge.

The link between the sensor bridge and the Ethernet network typically is configured for asymmetrical communication, for reducing power consumption, in an embodiment. The direction of sending data originating by the sensor toward the controller for carrying high-speed data is referred to as "downlink", and the direction of sending commands originating by the controller toward the sensor for carrying low-speed commands is referred to as "uplink".

In a typical conventional system, the sensors send to the controller both image data as well as auxiliary data related to the image data. The auxiliary data comprise, for example, any suitable data that may serve for fast generation of commands for controlling the sensor, such as statistical information regarding the sensor data, e.g., a histogram of image pixels.

In principle, the remotely disposed controller could generate, based on the auxiliary data, control commands for controlling and configuring the sensor, and send the control commands over the Ethernet network and via the sensor bridge back to the sensor. This control scheme, however, has several disadvantages as described herein. For example, the control scheme above would undesirably interrupt the controller for analyzing the auxiliary data and generating control commands. As another example, because the auxiliary data in the downlink direction and commands in the uplink direction are both sent over the Ethernet network, the overall response time may be impacted (i.e., lengthened) by travel time for communicating between the sensor and the remotely located controller. Moreover, the controller typically would send many commands to the sensor, which would (i) possibly overload the network, cause congestion and further lengthen latency, and (ii) increase power consumption in the bridge.

Consider an apparatus for controlling an imaging sensor in a vehicle, the apparatus comprising an Ethernet transceiver, a sensor interface and a processor that is local to the apparatus. The Ethernet transceiver is configured to communicate over an in-vehicle Ethernet network with a remote processor such as a central controller. The sensor interface is configured to communicate with the imaging sensor. The local processor is configured to receive from the imaging sensor, via the sensor interface, image data and auxiliary data related to the image data, and to send at least the image data to the remote processor via the Ethernet transceiver. The local processor is further configured to generate locally, based on the auxiliary data, and independently from the remote processor, control commands to control an operational aspect of the imaging sensor, and to send the control commands to the imaging sensor via the sensor interface.

In some embodiments the local processor generates locally at least some of the control commands instead of the remote processor, so as to reduce traffic load in the Ethernet network created by sending control commands for controlling the sensor by the remote processor over the Ethernet network.

In some embodiments, the receiver of the Ethernet transceiver needs to be empowered for communication in the uplink direction and preferably powered down when unneeded. In such embodiments, the local processor powers down the receiver in response to detecting that no commands have been received from the remote processor for a predefined period. In an embodiment, the local processor schedules powering the receiver up and down in accordance with the Energy-Efficient Ethernet (EEE) protocols, to reduce power consumption. EEE is specified, for example, in IEEE Standard 802.3ch-2020, entitled "IEEE Standard for Ethernet—Amendment 8: Physical Layer Specifications and Management Parameters for 2.5 Gb/s, 5 Gb/s, and 10 Gb/s Automotive Electrical Ethernet," July, 2020, which is incorporated herein by reference.

In some embodiments the imaging sensor comprises a camera that generates the image data by capturing individual image frames, and to provide the auxiliary data for the individual image frames, and the local processor locally generates the control commands by processing the auxiliary data for the individual image frames. For example, in an embodiment, the individual image frames comprise multiple image pixels, the auxiliary data includes a histogram of luminance levels associated with the image pixels of a given image frame, and the local processor locally generates the control commands by processing the histogram of the given image frame.

In an embodiment, the local processor generates the control commands to control a quality level of the individual image frames by controlling one or more operational aspects of the camera selected from a list comprising: exposure time, contrast, color balance, aperture, and sensor sensitivity.

Providing commands to the sensor by the local processor instead of the remote processor reduces response time significantly, which is some use cases, such for driving automation is crucial for safety. In one embodiment the local processor locally provides a given control command to the sensor at a first latency that is shorter than a second latency incurred in remotely providing the given control command by the remote processor.

The local processor may selectively inform the remote processor of the control commands generated by the local processor. In an example embodiment, the local processor signals the remote processor to avoid sending commands already generated by the local processor.

In the uplink direction the local processor forwards to the sensor commands that were sent by the remote processor over the Ethernet network. The local processor receives from the remote processor a given control command that the remote processor has generated based on one or both of the image data and the auxiliary data and sends the received given control command to the imaging sensor. For example, the sensor comprises a camera that captures multiple image frames, and the given control command comprises a focus command that the remote processor generated by analyzing two or more of the image frames, for controlling a focus setting of the camera.

In the disclosed techniques, a sensor bridge communicates locally with a sensor via a local link and remotely with a remote controller over an Ethernet network. The sensor sends to the bridge sensor data such as image frames and auxiliary data (e.g., statistical information related to the image frames). The sensor bridge locally generates commands for controlling various operational aspects of the sensor. The controller may also generate commands for controlling the sensor, e.g., commands that the sensor bridge cannot generate due to insufficient computational capabilities.

The control loop in which the sensor bridge locally provides commands to the sensor is much more efficient and has reduced latency, compared to a conventional control loop that includes the Ethernet network and the remote controller. Latency reduction is important for safety in automotive applications. Moreover, generating at least some the commands locally reduces the number of commands that the remote controller is required to generate, and consequently reduces the traffic load on the Ethernet network. Power consumption is also reduced because reducing the rate of commands allows the Ethernet uplink to be down for longer periods.

FIG. 1 is a block diagram that schematically illustrates an automotive Ethernet communication system 20 with local sensor control, in accordance with an embodiment that is described herein. In the embodiment described herein, communication system 20 is installed in a vehicle 24, and comprises multiple sensors 28 that communicate with, and are controlled by, a controller 32. In other embodiments (not seen), system 20 may be installed in an industrial network, surveillance network or other suitable communications network.

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders, or other proximity sensors, and the like. Controller 32 may comprise any suitable type of processor, e.g., a CPU or a GPU.

Sensors 28 and controller 32 communicate via an Ethernet network comprising multiple network links 40 and one or more Ethernet switches 44. Ethernet links 40 may comprise, for example, twisted-pair cables. Sensors 28 connect to the Ethernet network via one or more sensor bridges 36. A given sensor bridge may connect a single sensor or multiple sensors to the Ethernet network.

Sensor bridges 36, switches 44 and controller 32 may communicate over network links 40 at any suitable bit rate. Example bit rates are 2.5 Gb/s, 5 Gb/s or 10 Gb/s, in accordance with the IEEE 802.3ch-2020 standard. In some embodiments, sensor bridges 36 and controller 32 communicate using EEE, in accordance with IEEE 802.3ch-2020, cited above.

An inset on the left-hand side of FIG. 1 illustrates an example implementation of controller 32 and sensor bridge 36, in an embodiment. In the present example, controller 32 and sensor bridge 36 communicate over an in-vehicle Ethernet network 48 that supports EEE. FIG. 1 provides a high-level description of sensor data flow and command flows in the system.

In the embodiment of FIG. 1, controller 32 comprises an Ethernet transceiver (TCVR) 52 for communicating over network 48, and a processor 56 that carries out the various controller tasks. Processor 56 comprises, possibly among other components, an analyzer 60 (also referred to as a "remote analyzer"). Sensor bridge 36 comprises an Ethernet transceiver (TCVR) 72 for communicating over network 48, a processor 76 that carries out the various sensor bridge tasks, and a sensor interface 80 for communicating with sensor 28 over a local link. Sensor interface 80 may exchange control data with sensor 28 using, for example, an Inter-Integrated Circuit (I$^2$C) bus, an Improved Inter-Integrated Circuit (I$^3$C) bus, a General-Purpose Input-Output (GPIO) interface, a Peripheral Component Interconnect express (PCIe) bus, the Serial Peripheral Interface (SPI), or any other suitable local link. Additionally, sensor interface 80 receives sensor data and auxiliary data related to the sensor data, from sensor 28, using a suitable data interface. Processor 76 comprises, possibly among other components, an analyzer 88 (also referred to herein as a "local analyzer").

In a typical flow starting with sensor 28, processor 76 receives sensor data and auxiliary data related to the sensor data from sensor 28 via sensor interface 80 and sends the sensor data and auxiliary data to Ethernet network 48, in the form of Ethernet packets, using Ethernet transceiver 72. Based on analysis of the auxiliary data by local analyzer 88, processor 76 generates control commands, also referred to herein as "local commands", and sends the local commands directly to sensor 28 via sensor interface 80.

Ethernet transceiver 52 receives the Ethernet packets carrying the sensor data and optionally auxiliary data and forwards them to processor 56. Remote analyzer 60 analyzes the sensor data and/or auxiliary data, and based on the analysis results, processor 56 generates control commands for controlling the sensor. The control commands generated by processor 56 are also referred to herein as "remote commands" to be distinguished from the "local commands" generated by processor 76 of the sensor bridge.

Controller 60 sends the remote commands, in the form of Ethernet packets, to network 48 using Ethernet transceiver 52. Ethernet transceiver 72 receives the packets carrying the remote commands from the network, and processor 76 sends the remote commands to sensor 28 using sensor interface 80.

In an embodiment, controller 32 may carry out the above process concurrently for multiple Ethernet packets that convey control data to various sensors 28 via various sensor bridges 36. Similarly, sensor bridge 36 may carry out the above process concurrently for multiple Ethernet packets that convey control data to various sensors 28 connected thereto.

Figure 2:
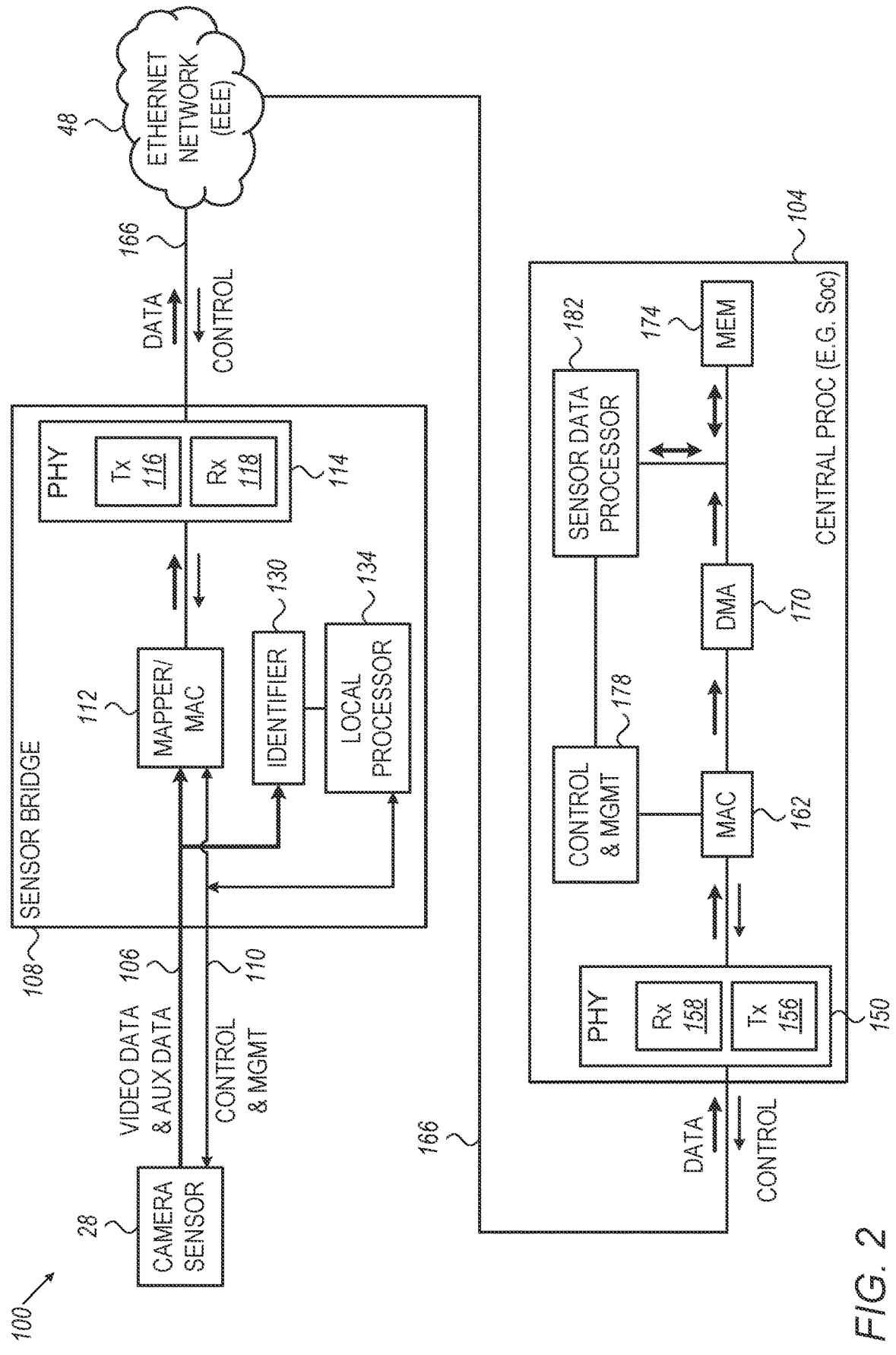
FIG. 2 is a block diagram that schematically illustrates a communication system, depicting implementation details of a central processor and a sensor bridge, in accordance with an embodiment that is described herein.

FIG. 2 is a block diagram that schematically illustrates a communication system 100, including implementation details of a central processor 104 and sensor bridge 108, in accordance with an embodiment that is described herein. System 100 can be used in implementing communication system 20 of FIG. 1.

In communication system 100, depicted by way of example, sensor 28 comprises a digital camera that communicates data and control information with central processor 104 of vehicle 24, via sensor bridge 108 and over Ethernet network 48.

In the example of FIG. 2, camera 28 sends video data to the sensor bridge over a high-speed link 106 and communicates control and management data with the sensor bridge over a low-speed control link 110.

Camera 28 generates the video data by capturing image frames at a required frame rate. Each of the image frames comprises multiple image pixels, e.g., arranged in a Two-Dimensional (2D) array. The image pixels carry luminance information in a suitable format, such as, for example, gray luminance levels, or color luminance levels in accordance with the Red-Green-Blue (RGB) representation or the YUV model, for example.

Camera 28 is controllable using control commands, e.g., sent to the camera via control link 110. The commands control various operational aspects of the camera, such as, for example, frame rate, image resolution, view angle, zoom in and zoom out, sensor sensitivity, aperture, exposure time, color balance (e.g., white balance) and focus. In response to receiving a command, the camera controls one or more of the operational aspects, accordingly.

In some embodiments, in addition to the video data, camera 28 outputs auxiliary data related to the video data. The auxiliary data may serve for generating control commands for the camera by sensor bridge 36, central processor 104, or both.

In some embodiments the auxiliary data comprise per-frame statistical information related to the pixels in the image frame, e.g., a histogram of the luminance levels of the pixels of the image frame. Alternatively or additionally, the auxiliary data may comprise other per-frame attributes such as contrast level, color shift, saturation, and the like. In an embodiment, some of the auxiliary data comprises camera settings reported by the camera on demand, and acknowledgement notifications that the camera sends in response to the commands.

In sensor bridge 108, a data path comprises a Mapper/Medium Access Control (MAC) module 112 and an Ethernet physical layer (PHY) transceiver 114 comprising a PHY transmitter 116 and a PHY receiver 118. In the present example, PHY transceiver 114 is coupled to network 48 using a twisted-pair link 166.

In the downlink direction, Mapper/MAC module 112 receives video data and auxiliary data from camera 28, via link 106, and applies mapping and MAC functions such identifying the video and control signals (in headers of the video frames) and mapping them into a format that can be used by the MAC for encapsulation of the video data and auxiliary data over Ethernet packets. The Mapper/MAC module transmits the Ethernet packets carrying the video data and auxiliary data to Ethernet network 48 using PHY transmitter 116. In the uplink direction, PHY receiver 118 receives from network 48 Ethernet packets carrying commands that the remote controller generates for controlling the camera. MAC module 112 depacketizes the received Ethernet packets to extract the commands and sends the commands to camera 28 via control link 110.

Sensor bridge 108 further comprises an identifier 130 and a local processor 134. Identifier 130 monitors link 106 to identify the auxiliary data and provides the identified auxiliary data to the local processor. The local processor processes the auxiliary data for locally generating commands for controlling camera 28. The local processor sends the locally generated commands directly to the camera via control link 110.

In some embodiments, the auxiliary data comprise a histogram of an individual video frame, (or multiple histograms, e.g., in case the YUV or RGB channels are provided separately). In such embodiments, the local processor may generate commands for the sensor based on the histogram(s), e.g., by identifying populated histogram bins that may indicate nonoptimal sensor configuration. For example, in some embodiments the local processor may generate a command for adjusting the sensor exposure or white balance on the fly, based on the histogram.

In an embodiment, the local processor generates commands based on the histogram using a Lookup Table (LUT). For example, the local processor sums the number of pixels in histogram bins associated with over exposure (e.g., histogram bins having the highest luminance levels) and access the LUT using the sum result of using a normalized version of the sum result. In this example, the LUT entries store appropriate commands for reducing the sensor exposure. In some embodiments, the local processor determines a final command based on outputs from multiple LUTs, e.g., separate LUTs for the three RGB channels.

As another example, the sensor temperature is embedded in the aux data, and in response to identifying a dangerously high temperature, the local processor may shut down or slow down the sensor (e.g., reduce frame rate and/or resolution) to reduce the temperature.

In some embodiments, the sensor bridge supports downloading and/or configuring a program that the local processor runs for generating commands. This feature allows users to flexibly apply modifications to the functionality of the local processor, as required.

Central processor 104 comprises a PHY transceiver 150 comprising a PHY transmitter 156 and a PHY receiver 158, and a MAC module 162. PHY transceiver 150 is coupled to Ethernet network 48 using a twisted-pair link 166. In the downlink direction, MAC module 162 receives, via PHY receiver 158, Ethernet packets carrying video data (e.g., a sequence of image frames) and auxiliary data originating from the camera.

MAC module 162 decapsulates the packets to extract the image frames and auxiliary data, forwards the image frames using a DMA module 170 for storage in a memory 174, and forwards the auxiliary data to controller 178. Data processor 182 reads the image frames from memory 174 and processes the read image frames, e.g., for display and controlling the operation of the vehicle.

Memory 174 may comprise any suitable type of memory. For example, memory 174 may comprise a volatile memory such as a Random Access Memory (RAM), or a nonvolatile memory. Memory 174 may reside within the central processor as seen in the figure, or externally to the central processor.

Controller 178 processes the image frames and optionally the auxiliary data for generating control commands for controlling the camera. Controller 178 sends these commands to MAC module 162, for packetization, and PHY transmitter 156 transmits the packets to network 48.

In some embodiments, local processor 134 generates for the camera commands that would otherwise be generated by the remote controller. In this sense, the local processor generates these commands on behalf of the remote controller.

In general, local processor 134 controls the sensor so that the sensor output is valid and meaningful. For example, the local processor controls the sensor to output video frames with proper exposure, white balance, contrast, and the like. The local processor may also handle safety related matters, such as high temperatures. In contrast, the remote central processor (104) processes the actual sensor data, such as video frames or LiDar data. The remote central processor may analyze the video frames, e.g., to identify certain objects in the scene.

In some embodiments controller 178 generates commands for controlling camera 28 based on the image frames, auxiliary data, or both. Controller 178 may generate commands that are different from the commands generated locally by local processor 134, e.g., commands that override the commands generated by the local processor, and/or commands that the local processor cannot generate due to limited computational resources.

In an embodiment, local processor 134 may inform controller 178 of at least some of the commands that the local processor has generated locally, e.g., to avoid sending redundant commands by controller 178. Local processor 134 may selectively inform controller 178 of at least some of the locally generated commands, e.g., commands that the local processor generates frequently.

In some embodiments, controller 178 has higher computational capabilities than local processor 134 of the sensor bridge. Consequently, local processor 134 may generate commands only based on the auxiliary data and not on the image frames. In contrast, controller 178 has sufficient resources to generate commands based on the full image frames information (and possibly based on the auxiliary data). For example, based on the video data (the image frames) controller 178 may detect that the number of saturated pixels in one or more video frames exceeds a specified threshold number, and generate one or more commands for the camera to reduce the exposure time, aperture, or both. Commands that may be generated by controller 178 but not by the local processor 134 may include commands for modifying one or more camera settings such as frame rate, image resolution, view angle, zoom in and zoom out, and focus.

Some types of cameras (28) are sensitive to temperature and may even malfunction at high temperatures. In an embodiment, to prevent such camera malfunction, the local processor 134 monitors the temperature, and in response to detecting that the temperature exceeds a specified temperature limit, local processor 134 may act quickly to reduce the temperature, e.g., by shutting the camera down.

In some embodiments the sensor bridge and camera reside physically close to one another, in which case the camera may absorb heat produced by the sensor bridge. By reducing power dissipation in the sensor bridge due to reduced rate of commands sent by the remote controller (as described above), the camera temperature is reduced as well.

FIG. 3 is a flow chart that schematically illustrates a method for local generation of commands for controlling a camera in a vehicle, in accordance with an embodiment that is described herein.

The method will be described as executed by elements of sensor bridge 108 of FIG. 2 above. The sensor bridge is assumed to be coupled to a sensor comprising a video camera.

The method begins with sensor bridge 108 receiving from sensor 28 video frames captured by the camera, and auxiliary data related to the video frames, at a reception operation 200. At an identification operation 204, identifier 130 monitors the data received at operation 200 to identify the auxiliary data and sends the identified auxiliary data to local processor 134.

At a forwarding operation 208, the sensor bridge sends the video frames (and optionally the auxiliary data) received at operation 200 to controller 178, over network 48. At a local processing operation 212, local processor 134 processes the auxiliary data to locally generate one or more commands for controlling the camera. At a local control operation 216, the sensor bridge sends the locally generated commands directly to the camera. At an informing operation 220, the sensor bridge optionally informs controller 178 of the locally generated commands, e.g., to avoid generating the same commands by both local processor 134 and controller 178.

Following operation 220 the method loops back to operation 200 for receiving subsequent video frames and auxiliary data from the camera.

FIG. 4 is a flow chart that schematically illustrates a method for relaying commands generated by a remote controller, for controlling a camera in a vehicle, in accordance with an embodiment that is described herein.

The method will be described as executed by elements of sensor bridge 108 of FIG. 2 above. The sensor bridge is assumed to be coupled to a sensor comprising a video camera.

The method begins at a command reception operation 250, with sensor bridge 108 receiving a command for controlling the camera, over network 48, wherein the command was generated by remote controller 178 (and not locally by the sensor bridge). At a command relaying operation 254, the sensor bridge sends the remotely generated command to the camera.

Following operation 254, the method loops back to operation 250 to receive a subsequent command from the remote controller.

The methods of FIGS. 3 and 4 above may be executed in parallel to one another, in an embodiment.

The embodiments described above are given by way of example, and other suitable embodiments can also be used. For example, although in the embodiments described above employ the EEE protocol, other suitable protocols for connecting between the sensor and the Ethernet network can also be used. Examples of such protocols include the Mobile Industry Processor Interface (MIPI) (A-PHY) protocol and the Automotive SerDes Alliance (ASA) protocol.

The configurations of the various systems, controllers and sensor bridges, shown in FIGS. 1 and 2, are example configurations that are depicted solely for the sake of clarity. In alternative embodiments, any other suitable configurations can be used. The different elements of the various systems, controllers and sensor bridges described herein may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions of the disclosed systems, controllers and sensor bridges, may be implemented in software and/or using a combination of hardware and software elements. Elements that are not mandatory for understanding of the disclosed techniques have been omitted from the figure for the sake of clarity.

In some embodiments, some functions of the disclosed systems, controllers and sensor bridges, e.g., functions of processor 56, 76, 134 and/or 182, identifier 130 and/or controller 178, may be implemented in one or more programmable processors, e.g., one or more Central Processing Units (CPUs), microcontroller and/or Digital Signal Processors (DSPs), which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for controlling an imaging sensor in a vehicle, the apparatus comprising:
   an Ethernet transceiver configured to communicate, over an in-vehicle Ethernet network, with a remote processor;
   a sensor interface configured to communicate with the imaging sensor; and
   a local processor that is (i) local to the apparatus and (ii) remotely located from the remote processor, the local processor configured to:
      receive from the imaging sensor, via the sensor interface, (i) image data and (ii) auxiliary data related to the image data, and send at least the image data to the remote processor via the Ethernet transceiver;
      generate locally at the local processor, (i) based on the auxiliary data and (ii) independently from the remote processor, a control command to control an operational aspect of the imaging sensor, wherein the control command to control the operational aspect of the imaging sensor is also generatable by the remote processor independently from the local processor;
      send the control command to control the operational aspect of the imaging sensor to the imaging sensor via the sensor interface on behalf of the remote processor; and
      prevent the remote processor from independently sending the same control command to control the operational aspect of the imaging sensor by informing the remote processor that the control command to control the operational aspect of the imaging sensor has already been sent by the local processor.

2. The apparatus according to claim 1, wherein the local processor is configured to generate the control command locally instead of the remote processor, so as to reduce traffic load in the Ethernet network created by sending control commands for controlling the sensor by the remote processor over the Ethernet network.

3. The apparatus according to claim 1, wherein the transceiver comprises a transmitter and a receiver, and wherein the local processor is configured to power down the receiver, in response to detecting that no commands are received from the remote processor for a predefined period.

4. The apparatus according to claim 1, wherein the imaging sensor comprises a camera that is configured to generate the image data by capturing individual image frames, and to provide the auxiliary data for the individual image frames, and wherein the local processor is configured to locally generate the control command by processing the auxiliary data for the individual image frames.

5. The apparatus according to claim 4, wherein the individual image frames comprise multiple image pixels, wherein the auxiliary data comprises a histogram of luminance levels associated with the image pixels of a given image frame, and wherein the local processor is configured to locally generate the control command by processing the histogram of the given image frame.

6. The apparatus according to claim 4, wherein the local processor is configured to generate the control command to control a quality level of the individual image frames by controlling one or more operational aspects of the camera selected from a list comprising: exposure time, contrast, color balance, aperture, and sensor sensitivity.

7. The apparatus according to claim 1 wherein the local processor is configured to locally provide the control command to the sensor at a first latency that is shorter than a second latency incurred in remotely providing the control command by the remote processor.

8. The apparatus according to claim 1, wherein the local processor is configured to receive from the remote processor a given control command that the remote processor has generated based on one or both of the image data and the auxiliary data, and to send the received given control command to the imaging sensor.

9. The apparatus according to claim 8, wherein the sensor comprises a camera that generates the image data by capturing multiple image frames, and wherein the given control command comprises a focus command that the remote processor generated by analyzing two or more of the image frames, for controlling a focus setting of the camera.

10. A method for controlling an imaging sensor in a vehicle, the method comprising:
   in an apparatus that communicates (i) locally with an imaging sensor via a sensor interface and (ii) with a remote processor over an in-vehicle Ethernet network using an Ethernet transceiver,
   receiving from the imaging sensor via the sensor interface (i) image data and (ii) auxiliary data related to the image data, and sending at least the image data to the remote processor over the Ethernet network using the Ethernet transceiver;
   generating locally in the apparatus, (i) based on the auxiliary data and (ii) independently from the remote processor, a control command to control an operational aspect of the imaging sensor, wherein the control command to control the operational aspect of the imaging sensor is also generatable by the remote processor independently from the local processor;
   sending the control command to control the operational aspect of the imaging sensor to the imaging sensor via the sensor interface on behalf of the remote processor; and
   preventing the remote processor from independently sending the control command to control the operational aspect of the imaging sensor by informing the remote processor that the control command to control the operational aspect of the imaging sensor has already been sent by the local processor.

11. The method according to claim 10, wherein generating the control command comprises generating the control command locally in the apparatus instead of the remote processor, so as to reduce traffic load in the Ethernet network created by sending control commands for controlling the sensor by the remote processor over the Ethernet network.

12. The method according to claim 10, wherein the transceiver comprises a transmitter and a receiver, and comprising powering down the receiver, in response to detecting that no commands are received from the remote processor for a predefined period.

13. The method according to claim 10, wherein the imaging sensor comprises a camera that generates the image data by capturing individual image frames and provides the auxiliary data for the individual image frames, and wherein locally generating the control command comprises processing the auxiliary data for the individual image frames.

14. The method according to claim 13, wherein the individual image frames comprise multiple image pixels, wherein the auxiliary data comprises a histogram of luminance levels associated with the image pixels of a given image frame, and wherein generating the control command comprises processing the histogram of the given image frame.

15. The method according to claim 13, wherein generating the control command to control a quality level of the image frames comprises controlling one or more operational aspects of the camera selected from a list comprising: exposure time, contrast, color balance, aperture, and sensor sensitivity.

16. The method according to claim 10, wherein sending the control command comprises locally providing the control command to the sensor at a first latency that is shorter than a second latency incurred in remotely providing the given control command by the remote processor.

17. The method according to claim 10, and from the remote processor a given comprising receiving control command that the remote processor has generated based on one or both of the image data and the auxiliary data, and sending the received given control command to the imaging sensor.

18. The method according to claim 17, wherein the sensor comprises a camera that generates the image data by capturing multiple image frames, and wherein the given control command comprises a focus command that the remote processor generated by analyzing two or more of the image frames, for controlling a focus setting of the camera.

19. The apparatus according to claim 1, wherein the local processor is configured to inform the remote processor that the control command has already been sent, only when the control command is of a defined type of control commands.

20. The apparatus according to claim 19, wherein the defined type of control commands corresponds to commands that are generated frequently.

21. The method according to claim 10, wherein informing the remote processor that the control command has already been sent is performed only when the control command is of a defined type of control commands.

22. The method according to claim 21, wherein the defined type of control commands corresponds to commands that are generated frequently.

\*  \*  \*  \*  \*